(12) United States Patent
Gilbert

(10) Patent No.: US 7,041,044 B2
(45) Date of Patent: May 9, 2006

(54) ROTATABLE MACHINE OR CENTRIFUGE WITH DRIVING MOTORS IN A SIMPLE CASING

(75) Inventor: Luc Gilbert, Paris (FR)

(73) Assignee: Andritz-Guinard S.A.S., (FR)

( * ) Notice: Subject to any disclaimer, the term of this patent is extended or adjusted under 35 U.S.C. 154(b) by 204 days.

(21) Appl. No.: 10/688,260

(22) Filed: Oct. 17, 2003

(65) Prior Publication Data
US 2004/0232791 A1 Nov. 25, 2004

(30) Foreign Application Priority Data
May 19, 2003 (EP) ............................... 03011337

(51) Int. Cl.
*B04B 1/20* (2006.01)
*B04B 9/02* (2006.01)

(52) U.S. Cl. ............... 494/53; 494/84; 310/156.11

(58) Field of Classification Search ........... 494/50–54, 494/84, 7–9; 210/380.1, 380.3; 310/156.01, 310/156.08, 156.11
See application file for complete search history.

(56) References Cited

U.S. PATENT DOCUMENTS

| | | | | |
|---|---|---|---|---|
| 3,923,241 A | * | 12/1975 | Cyphelly | .................. 494/84 |
| 4,120,447 A | * | 10/1978 | Jager | .......................... 494/84 |
| 4,327,862 A | * | 5/1982 | Jakobs | ....................... 494/84 |
| 4,369,915 A | * | 1/1983 | Oberg et al. | ................. 494/9 |
| 5,037,372 A | * | 8/1991 | Weder | ........................ 494/53 |
| 6,051,896 A | * | 4/2000 | Shibuya et al. | ....... 310/156.08 |
| 6,100,618 A | * | 8/2000 | Schoeb et al. | |
| 6,223,512 B1 | * | 5/2001 | Koltze et al. | |
| 6,387,032 B1 | * | 5/2002 | Beyer | ........................ 494/84 |
| 2004/0226442 A1 | * | 11/2004 | Olsson et al. | |

FOREIGN PATENT DOCUMENTS

| | | | |
|---|---|---|---|
| DE | 3325566 A1 | * | 1/1985 |
| WO | 2005/011871 A1 | * | 2/2005 |

* cited by examiner

*Primary Examiner*—Charles E. Cooley
(74) *Attorney, Agent, or Firm*—Ostrolenk, Faber, Gerb & Soffen, LLP

(57) ABSTRACT

The rotatable machine (1) of the invention comprises a chamber (2) and a shaft (3), wherein the shaft (3) is mounted in the chamber (2) such that, upon rotation of the shaft (3) and the chamber (2), the shaft (3) and the chamber (2) each rotate about the same axis (4), and a first motor (20) for driving the chamber (2) and a second motor (30) for driving the shaft (3), each motor (20, 30) having an axis, wherein the axes of the first and second motors (20, 30) and the axis (4) of rotation of the chamber (2) and of the shaft (3) are coincident.

3 Claims, 3 Drawing Sheets

ROTATABLE MACHINE OR CENTRIFUGE WITH DRIVING MOTORS IN A SIMPLE CASING

FIELD OF THE INVENTION

The present invention is generally directed to systems for driving rotatable machines. In a particular embodiment the invention is directed to systems for rotating a centrifuge.

BACKGROUND OF THE INVENTION

Centrifuges are commonly used in operations involving operations such as the separation of a liquid and a solid of different densities, purifying a liquid, classifying various solids suspended in a liquid, dehydrating a solid, etc.

Centrifuges generally comprise a chamber, known as the bowl, into which the solid/liquid mixture is introduced, and an endless screw extending into the bowl along its axis. The bowl and the screw are driven in rotation at different speeds in order to carry out the abovementioned operations.

In conventional centrifuges, the bowl can be driven in rotation by an asynchronous electric motor via a belt, the screw being driven using a second motor coupled to a speed reducer. The two motors are generally frequency coupled by various well-known means.

However, in such centrifuges, the presence of a belt leads to vibration and slippage at the contacts between the belt and the drive shafts, whereas the bulk of such systems in terms of their volume and weight may prove prohibitive. Asynchronous electric motors are also subject to frequency slip which results in diminished performance.

It is also preferable in certain applications to use long-length small-diameter centrifuges. A disadvantage of such structures is the bending effect that may occur upon use of the device. This bending effect is particularly accentuated by the rotational speed and by the presence of belts between the driving spindles and the driven spindles, these belts exerting on the rotational spindles, a force perpendicular to them. The belts are therefore an obstacle stands in the way of increasing the rotational speed of such centrifuges because such increases lead to correspondingly increased bending.

SUMMARY OF THE INVENTION

The system of the present invention has therefore been developed in order to avoid the abovementioned disadvantages previously found in driving systems for rotatable machines, such as centrifuges.

In its broadest sense, the present invention provides a rotatable machine having first and second ends, wherein the machine comprises a chamber and a shaft, wherein the shaft is mounted in the chamber such that, upon rotation of the shaft and the chamber, both of these structures rotate about the same axis. The machine further comprises a first motor for driving the chamber, a second motor for driving the shaft, both the first and the second motors having an axis, wherein the axes of the motors and the axis of rotation of the chamber and of the shaft are coincident.

In one embodiment of the machine, the first and the second drive motors described above are each permanent-magnet synchronous motors comprising permanent magnets.

In another embodiment of the machine, the first and second drive motors are each located at the same end of the machine. In an alternate embodiment, the first and second drive motors are located one at each end of the machine.

In an additional embodiment, the machine further comprises a casing containing both the first and second drive motors.

In still another embodiment, the machine further comprises first and second shafts adapted for driving the chamber and the shaft, respectively, wherein the shafts are concentric and wherein they are push-fitted directly into corresponding rotors of the respective drive motors.

In a preferred embodiment, the invention provides a centrifuge having first and second ends wherein the centrifuge comprises a bowl and an endless screw, wherein the endless screw is mounted in the bowl such that upon rotation of the endless screw and the bowl, both of these structures rotate about the same axis. The centrifuge further comprises a first motor for driving the bowl and a second motor for driving the screw, both the first and the second motor having an axis, wherein the axes of the first and the second motors and the axis of rotation of the bowl and of the endless screw are coincident.

In one embodiment of the centrifuge of the invention, the first and second drive motors are each permanent-magnet synchronous motors comprising permanent magnets.

In another embodiment, the first and second drive motors are both located at the same end of the centrifuge. In an alternate embodiment, the first and the second drive motors are placed one at each end of the centrifuge.

In a further embodiment, the centrifuge of the invention further comprises a casing containing both the first and the second drive motors.

In still another embodiment, the centrifuge further comprises first and second shafts adapted for driving, respectively, the bowl and the endless screw, wherein the shafts are concentric and are push-fitted directly into corresponding rotors of the respective first and second drive motors.

With the use of the system of the invention, and by virtue of the coincidence of the axes of inertia, of rotation and of drive, the disadvantages of the conventional centrifuges are eliminated. Furthermore, maintenance becomes far easier.

BRIEF DESCRIPTION OF THE DRAWINGS

The invention will be better understood with the aid of the following description of several embodiments of a centrifuge constructed in accordance with the invention, with reference to the attached drawings in which.

DETAILED DESCRIPTION OF THE PREFERRED EMBODIMENTS

Figure 1:
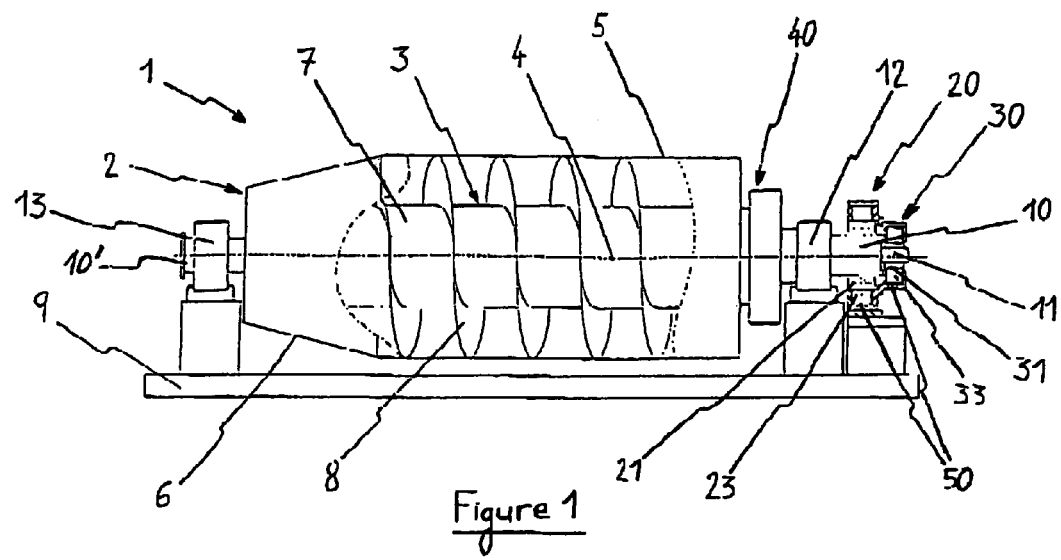
FIG. 1 depicts a partially sectioned side view of a cutaway of a first embodiment of the centrifuge.

With reference to FIG. 1, the centrifuge 1 produced according to the invention comprises a chamber 2, known as a bowl, and an endless screw 3, mounted to rotate inside of the bowl about an axis 4. Thus, the screw 3 extends into the bowl 2, in the direction of the axis 4. The bowl 2 of the invention overall has symmetry of revolution about the axis 4. Structurally, it comprises a barrel 5 of roughly cylindrical shape and a head 6 of roughly frustoconical shape. The screw 3 is in the form of a cylindrical shaft 7 provided with an external helical threading 8 around the shaft 7. The centrifuge 1 is mounted on a base 9.

Behind the bowl 2, that is to say at the base of its barrel 5, at the opposite end to the head 6, there extends a tubular shaft 10 for driving the bowl 2, secured to the bowl. Shaft 10 is driven in rotation by a motor 20 about the axis 4.

Inside the shaft 10 and concentric to this shaft there extends a shaft 11 for driving the screw 3. This shaft 11 is driven in rotation by a motor 30 about the axis 4.

A fixed bearing 12 supports the shaft 10, at the same end as the barrel 5 of the bowl 2. At the same end as the head 6 of the bowl 2, a bearing 13 supports a shaft 10', also secured to the bowl 2, but here in a floating manner so as to be able to compensate for any elongation there might be of the bowl 2 as a result of an increase in heat, for example. Moreover, as would be well understood by one of ordinary skill in this art, the arrangement of the bearings could be reversed if desired.

The two motors 20, 30 for driving the bowl 2 and the screw 3, respectively, are contained in the same casing 50. This configuration is possible because the drive motors 20, 30 used are motors without driving shafts. The annular shape of the rotors of drive motors 20, 30 allows the driven shaft of one of the two rotary parts to be inserted directly into the other, therefore allowing the two motors to be positioned in line, wherein the shafts of the rotary parts are concentric.

Figure 2:
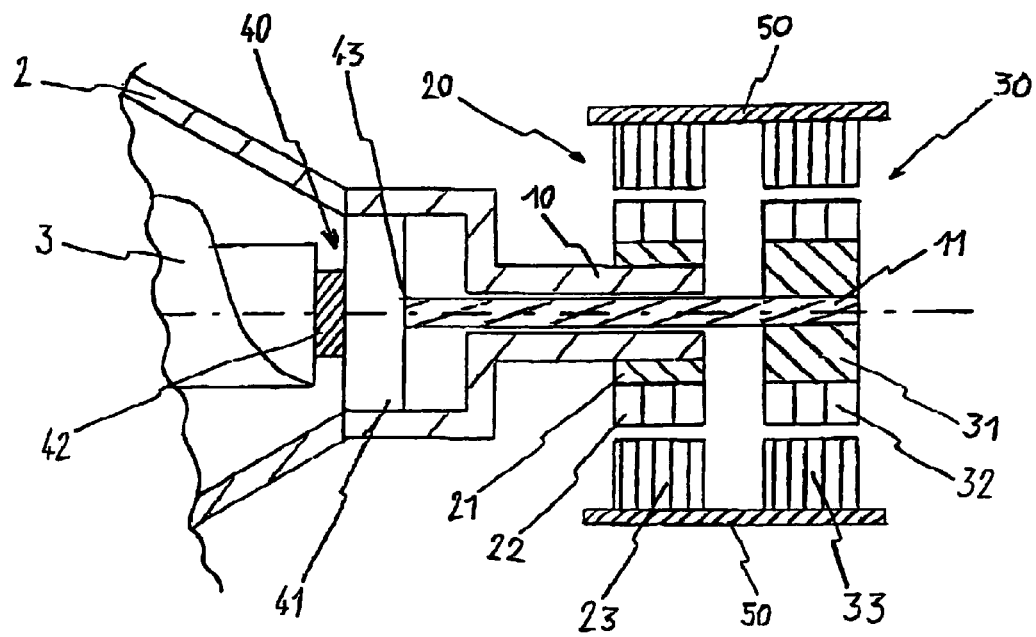
FIG. 2 is a sectional structural diagram of the motors, the shafts of the bowl and the screw, and of the speed reducer in a second embodiment of the centrifuge of the invention.

The structure of the drive motors 20, 30 used in the centrifuge of the invention will now be explained in greater detail with reference to FIG. 2.

The drive motors 20, 30 as shown are permanent-magnet synchronous motors. Thus, each motor 20, 30 has an annular rotor 21, 31, respectively, on which permanent magnets 22, 32, respectively, are securely mounted. Arranged around the magnets are windings 23, 33, respectively, through which a DC current passes. The induction phenomenon then causes the magnets 22, 23, and therefore the rotors 21, 31, to rotate. The windings 23, 33 are fixed to the same casing 50.

Two equivalent structure types are illustrated for the casing 50 containing the two motors 20, 30. With reference to FIG. 1, the windings 23, 33 may lie at different radial distances from the axis 4, in which case the casing 50 is designed to suit the offset between the windings 23, 33, but remains machined as a single housing. As shown in FIG. 2, however, the rotors 21, 31 may be dimensioned in such a way that the respective peripheries of the magnets 22, 32 lie at the same radial distance from the axis 4, making it possible, by using windings 23, 33 of the same radial thickness, to use a cylindrical casing 50 over the entire length supporting the two windings 23, 33. These configurations are described merely by way of example. It is of course possible to conceive alternate configurations in which the motors 20, 30 are aligned and supported by the same casing 50. Such alternate configurations are therefore also encompassed within the bounds of the present invention.

The drive shaft 10 for the bowl 2 is push-fitted into the rotor 21 of the motor 20 for driving the bowl 2. The shaft 11 for driving the screw 3 is push-fitted into the rotor 31 of the motor 30 for driving the screw 3. The motor 30 for driving the screw 3 is placed behind, with respect to the centrifuge 1, the motor 20 for driving the bowl 2. Thus, the shaft 11 for driving the screw 3 runs concentrically inside the tubular shaft 10 for driving the bowl 2.

Positioned between the bowl and the screw, on the one hand, and their respective drive shafts 10, 11 on the other, is a reducer 40. The reducer 40 as shown is comprised of an external annulus 41, an input "point" 43 for a shaft, a gear mechanism, in this instance a cycloid or epicycloid gearset (not depicted) comprising eccentrics, planet wheels and rollers, and an output spindle 42. This type of reducer is well known among those of ordinary skill in this art and is commonly used in conventional centrifuges. Its structure will therefore not be detailed here and reference can be made to French patent FR 1 090 292, which is incorporated herein by reference, for further details on the structure of this type of reducer.

The shaft 10 for driving the bowl 2 is fitted directly into the rotor 21 of the motor 20 for driving the bowl 2 and is mounted on the outer annulus 41 of the reducer 40. The shaft 11 for driving the screw 3 is fitted into the rotor 31 of the motor 30 for driving the screw 3 and into the input point 43 of the reducer 40. The bowl 2 is secured to the outer annulus 41 of the reducer 40 and the screw 3 is secured to its output spindle 42. There is a well-understood relationship among the rotational speed of the motor 20 for driving the bowl 2, the rotational speed of the motor 30 for driving the screw 3, the rotational speed of the bowl 2, which here is identical to that of its drive motor 20, the rotational speed of the screw 3, and finally constant parameters dependent on the geometry of the reducer 40. As is well known by one of ordinary skill in this art, this relationship is dependent upon the reducer used and makes it possible, by virtue of the two drive motors 20, 30, to regulate the rotational speeds of the bowl 2 and of the screw 3.

There is also a coupling between the two drive motors 20, 30. Each motor is connected to a device for varying the frequency, i.e., a frequency converter. These frequency converters are not, however, depicted in the drawings as they are well-known among those skilled in this art. The converters are connected by a continuous bus. This set-up allows the motors to be slaved to one another, and the relative speeds of the bowl 2 and of the screw 3 thus to be controlled. It is therefore possible to adapt these speeds to suit the use to which the centrifuge 1 is put.

The relationships between the various components of the centrifuge 1 are well known and already used in conventional centrifuges and will therefore not be gone into in great depth. The present invention lies in the alignment of the motors 20, 30, made possible by virtue of the use of motors 20, 30 without driving shafts, into which the shafts 10, 11 for driving the bowl 2 and the screw 3, concentric in this embodiment, are pushed. The use here of permanent-magnet synchronous motors 20, 30 is advantageous in many respects. It allows the motors to be more compact, gives greater flexibility of use, gives greater precision on measuring the speeds of the motors, permits operation at higher speeds, resistance to higher torques, etc. These advantages add to those inherent in aligning the drive axes of the motors 20, 30 with the axis of inertia of the bowl 2 and of the screw 3.

The manner in which the centrifuge 1 of the invention operates will now be explained in greater detail.

In a first, i.e., start-up, phase, only the motor 20 for driving the bowl 2 is started up, so as to set the bowl 2 in rotation. The torque required is high, because it is necessary to set into motion all of the various elements of the centrifuge 1 as well as the material which centrifuge 1 contains.

In a second phase, the motor 30 for driving the screw 3 is also started up, in order to set the screw 3 in rotation. This requires an additional torque.

Once a steady speed has been reached, the motor 30 for driving the screw 3 can be employed as a generator. The energy thus stored in the motor 30 for driving the screw 3 is directed back to the motor 20 for driving the bowl 2, via the frequency converters and the continuous bus. The manner in which the centrifuge 1 of the invention operates is not detailed further here since such operation is carried out in the manner well-known among those of ordinary skill with conventional centrifuges.

The presence of the reducer 40 is beneficial. Without such reducer 40 the torque on the shaft 11 driving the screw 3 would be very high. Further, the friction forces between the screw 3 and the bowl 2, via the material contained in the centrifuge 1, and because of the speeds involved, are very high.

Alternate embodiments of the centrifuge 1 of the invention are possible and will now be described. The operation of each of these embodiments is comparable with that which has been described above. Only the relative arrangements of the elements are different. The numerical references used to denote the various elements have been maintained in the description of these various embodiments to denote elements which are functionally or structurally identical therein.

Figure 3:
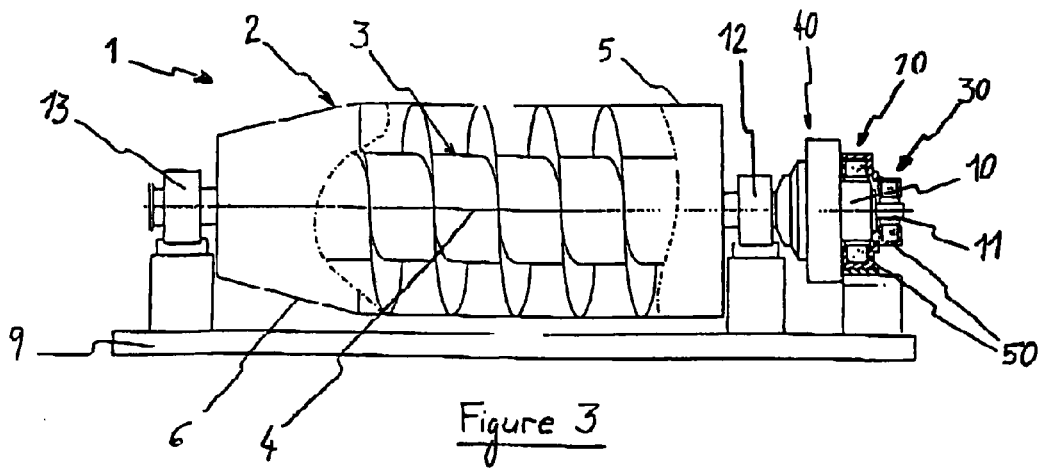
FIG. 3 is a partially sectioned side view of a third embodiment of the centrifuge of the invention.
Figure 4:
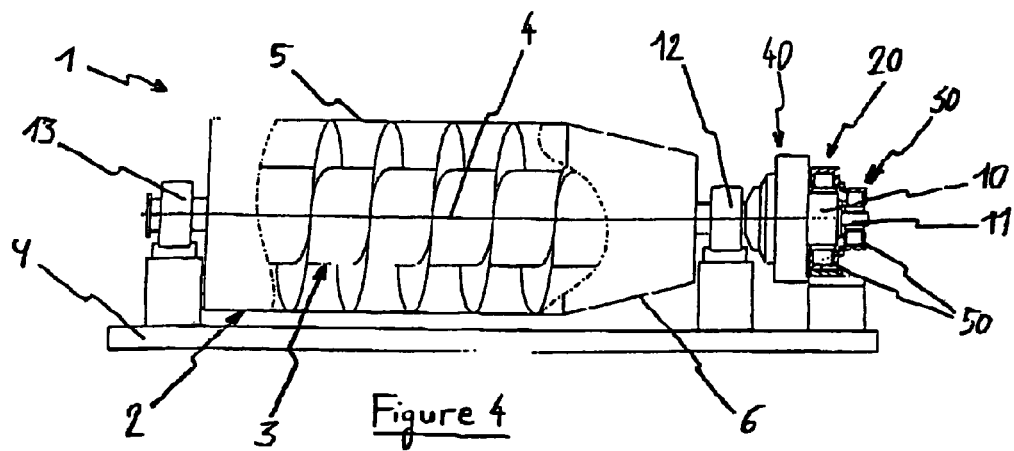
FIG. 4 is a partially sectioned side view of a fourth embodiment of the centrifuge of the invention.
Figure 5:
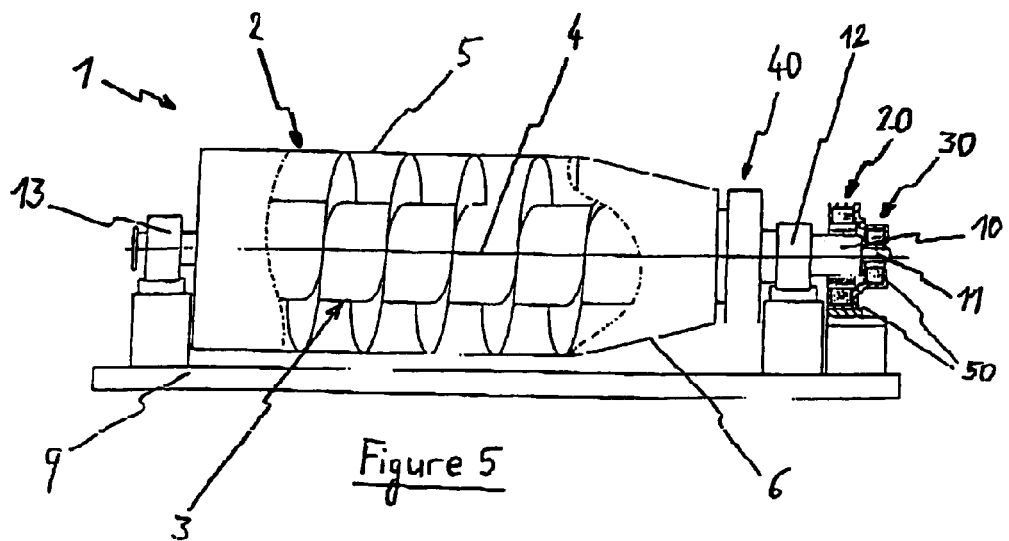
FIG. 5 is a partially sectioned side view of a fifth embodiment of the centrifuge of the invention.

In the embodiments depicted in FIGS. 3, 4 and 5, the motors 20, 30 are, as in the case of the first embodiment described above, contained in the same casing 50.

In the embodiment of centrifuge 1 depicted in FIG. 3, the fixed support bearing 12, which was located between the reducer 40 and the motors 20, 30 in the first embodiment, is located between the reducer 40 and the barrel 5 of the bowl 2. The other elements of the centrifuge are in all respects comparable to those of the first embodiment. The shaft 10 for driving the bowl 2 is still pushed at one end into the motor 20 for driving the bowl 2 and mounted at the other end on the external annulus 41 of the reducer, wherein the bowl 2 is secured to the external annulus 41. The shaft 11 for driving the screw 3 is still pushed at one end into the motor 30 for driving the screw 3 and at the other end into the input point 43 of the reducer 40, wherein the screw 3 is secured to the output spindle 42 of the reducer 40.

The embodiment of the centrifuge 1 depicted in FIG. 4 is in all respects similar to that of FIG. 3 except that the bowl 2 is oriented in the opposite direction. That is, the head 6 and the barrel 5 of the bowl 2 are reversed, the head 6 thus being at the motor end. The structure and operation of the centrifuge 1 apart from this aspect are comparable to those of the centrifuge 1 of FIG. 3.

The embodiment of the centrifuge 1 depicted in FIG. 5 is in all respects comparable to that of FIG. 1, except that, as shown in FIG. 4, the orientation of the bowl 2 is reversed, i.e., with the positions of the head 6 and the barrel 5 being reversed, by comparison with the other elements of the centrifuge 1.

Figure 6:
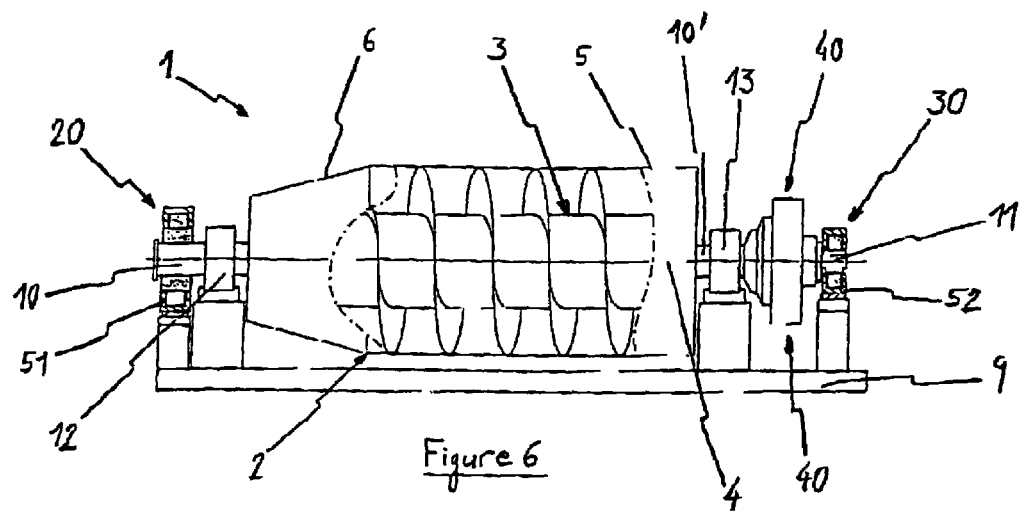
FIG. 6 is a partially sectioned side view of a sixth embodiment of the centrifuge of the invention.
Figure 7:
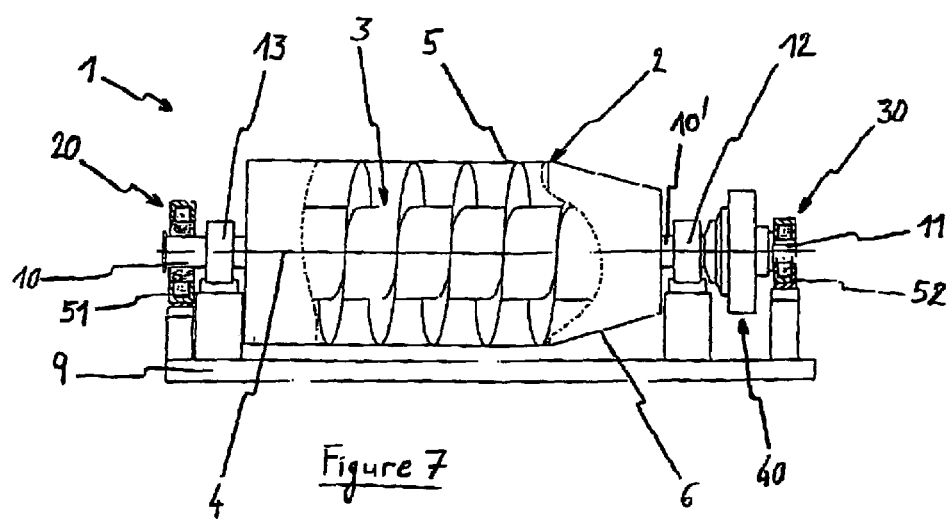
FIG. 7 is a partially sectioned side view of a seventh embodiment of the centrifuge of the invention.

In the embodiments depicted in FIGS. 6 and 7, the motors 20, 30 for driving the bowl 2 and the screw 3 are no longer contained in the same casing but are instead placed one at each end at the centrifuge 1, wherein each motor 20, 30 is contained in a different casing 51, 52.

Thus, in the embodiment of FIG. 6, the motor 20 for driving the bowl 2 is placed at the same end as the head 6 of the centrifuge 1, while the motor 30 for driving the screw 3 is placed at the same end as the barrel 5 of the centrifuge 1. This arrangement still falls within the scope of the invention because the axes of the motors 20, 30 are coincident with the axis 4 of inertia of the bowl 2 and of the screw 3.

At the same end as the head 6 of the bowl 2 of the centrifuge 1, the shaft 10 for driving the bowl 2 is pushed into the rotor of the motor 20 for driving the bowl 2. A fixed support bearing 12 supports this shaft 10. At the same end as the barrel 5 of the bowl 2, the shaft 11 for driving the screw 3 is pushed into the rotor of the motor 30 for driving the screw 3, and into the input point of the reducer 40. Furthermore, on the outer annulus of the reducer 40 is mounted a shaft 10' secured to the bowl 2, the latter therefore still being secured to the annulus. A floating bearing 13, located between the reducer 40 and the bowl 2, supports this shaft 10'. The other elements and arrangements of the centrifuge 1, and its operation, are in all respects comparable with those described above.

The embodiment of the centrifuge 1 of FIG. 7 differs from that shown in FIG. 6 in two respects. First, the head 6 and the barrel 5 of the bowl are reversed. Thus, the motor 20 for driving the bowl 2 is placed at the same end as the barrel 5 of the bowl 2 while the motor 30 for driving the screw 3 is placed at the same end as the head 6 of the bowl 2. Furthermore, the floating bearing 13 is at the same end as the motor 20 for driving the bowl 2, whereas the fixed bearing 12 is on the same as the motor 30 for driving the screw 3. Apart from these elements, the structures and operations of the elements of the centrifuge 1 are in all respects comparable with those of the other embodiments.

The description of the invention provided above details the use of permanent-magnet synchronous motors. It is to be noted, however, that such description is provided only for purposes of illustrating the invention and any type of motor which permits the axes of drive and of inertia to be aligned may be used in the invention.

What is claimed is:

1. A rotatable machine (1) having first and second ends, said machine (1) comprising a chamber (2) and a shaft (3), said shaft (3) mounted in said chamber (2) such that, upon rotation of said shaft (3) and said chamber (2), said shaft (3) and said chamber (2) each rotate about the same axis (4), a first motor (20) for driving the chamber (2) and a second motor (30) for driving the shaft (3), each said motor (20, 30) having an axis, wherein the axes of the first and second motors (20, 30) and the axis (4) of rotation of the chamber (2) and of the shaft (3) are coincident, the first motor (20) and the second motor (30) are both permanent-magnet synchronous motors comprising permanent magnets (22, 32), wherein the first and the second motors (20, 30) are both located at the same end of the machine (1), the rotatable machine further comprising a casing (50) containing both said first and said second motors (20, 30) and first and second shafts (10, 11) adapted for driving the chamber (2) and the shaft (3), respectively, wherein said shafts (10, 11) are concentric and are push-fitted directly into corresponding rotors (21, 31) of the respective motors (20, 30).

2. The rotatable machine according to claim 1, wherein said machine is a centrifuge in which the chamber comprises a bowl and the shaft comprises an endless screw.

3. A centrifuge (1) having first and second ends, said centrifuge (1) comprising a bowl (2) and an endless screw (3), said endless screw (3) mounted in said bowl (2) such that, upon rotation of said bowl (2) and said endless screw (3) said endless screw (3) and said bowl (2) each rotate about the same axis (4), a first motor (20) for driving the bowl (2) and a second motor (30) for driving the endless screw (3), each said motor (20, 30) having an axis, wherein the axes of the first and second motors (20, 30) and the axis (4) of rotation of the bowl (2) and of the endless screw (3) are coincident, wherein the first motor (20) and the second motor (30) are each permanent-magnet synchronous motors comprising permanent magnets (22, 32), the first and second motors (20, 30) are both located at the same end of the centrifuge (1), the centrifuge further comprising a casing (50) containing both said first and said second motors (20, 30) and first and second shafts (10, 11) adapted for driving the bowl (2) and the endless screw (3), respectively, wherein said shafts (10, 11) are concentric and are push-fitted directly into corresponding rotors (21, 31) of the respective motors (20, 30).

* * * * *